(12) United States Patent
Shie et al.

(10) Patent No.: US 6,522,374 B1
(45) Date of Patent: Feb. 18, 2003

(54) PASSIVE MATRIX LIQUID CRYSTAL DISPLAY

(75) Inventors: Rick L. Shie, Westlake Village; Jeffrey A. Laine, Redondo Beach; Gajendra D. Savant, Torrance, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/139,455

(22) Filed: Aug. 25, 1998

(51) Int. Cl.$^7$ .................. G02F 1/1335; G02B 13/20

(52) U.S. Cl. .................. 349/113; 349/112; 359/599

(58) Field of Search ................ 349/112, 113, 349/64; 359/443, 461, 448, 885, 15, 599; 362/558

(56) References Cited

U.S. PATENT DOCUMENTS

| | | | | |
|---|---|---|---|---|
| 4,266,859 A | * | 5/1981 | Togashi | 349/113 |
| 5,245,454 A | * | 9/1993 | Blonder | 349/113 |
| 5,337,179 A | * | 8/1994 | Hodges | 359/443 |
| 5,534,386 A | * | 7/1996 | Petersen et al. | 359/15 |
| 5,631,754 A | | 5/1997 | Jannson et al. | 349/64 |
| 5,886,675 A | * | 3/1999 | Aye et al. | 345/7 |
| 5,956,106 A | * | 9/1999 | Petersen et al. | 349/112 |
| 6,266,476 B1 | * | 7/2001 | Shie et al. | 385/147 |

FOREIGN PATENT DOCUMENTS

| | | | | |
|---|---|---|---|---|
| GB | 2058385 | * | 4/1981 | 349/113 |
| JP | 4-75022 | * | 3/1992 | 349/113 |

OTHER PUBLICATIONS

Shagam, R.N., Ph.D., "Light Shaping Diffusers™ Simplify Aircraft Inspection," *Photonics Spectra*, Nov. 1994.
Dusinberre, B., "Light Shaping Diffusers Enhance Depth--Finder Performance," *Laser Focus World*, Jun. 1995.
Szczesniak, S., & Shie, R., "Machine Vision for Semiconductor Manufacture," *Photonics Spectra*, Nov. 1995.
"Directional Turning Film™", Physical Optics Corporation, 1996, Brochure.
Giancola, S., "Hologrpahic Diffuser Makes Light Work of Screen Tests," *Photonics Spectra*, Aug. 1996.
Laine, J., "Mini Display," *Design News*, Dec. 15, 1997.
"Light Shaping Diffusers® Technical Data Sheet," Physical Optics Corporation, Jul. 1, 1998.
"Light Shaping Diffuser® Transmissive Thin Film Price List," Physical Optics Corporation, May 1, 1998.
"Light Shaping Diffuser® Transmission Kits Price List," Physical Optics Corporation, May 1, 1998.
"Light Shaping Diffuser® Transmission Sheet Price List," Physical Optics Corporation, May 1, 1998.
"LORS™ Reflection Screens Lights on Reflection Screen™," Physical Optics Corporation, May, 1, 1998.
"DDS™ Rear Projection Screens Digital Display Screen™," Physical Optics Corporation, May, 1, 1998.

(List continued on next page.)

*Primary Examiner*—William L. Sikes
*Assistant Examiner*—Tarifur R. Chowdhury
(74) *Attorney, Agent, or Firm*—Nilles and Nilles

(57) ABSTRACT

A viewing surface in the form of a passive liquid crystal display or front projection viewing screen includes a substrate layer of material having a front side and a back side. A light shaping micro-sculpted surface structure is provided on one side of the substrate layer wherein the microstructure controls the directionality, gain, homogeneity and shape distribution of the light propagated by the screen or display. A reflective layer is deposited on the opposite back side of the substrate layer and reflects light incident upon the substrate layer back through the substrate layer toward a viewing screen surface. This type of construction can be used directly as a viewing screen or can be utilized behind a display such as a liquid crystal display in order to significantly enhance the brightness of such a display or screen. The microstructure can be integral on either the front side of the substrate layer or beneath the reflective layer on the back side of the layer.

21 Claims, 3 Drawing Sheets

OTHER PUBLICATIONS

Tedesco J M et al., "5.3: HOLOGRAPHIC DIFFUSERS FOR LCD BACKLIGHTS AND PROJECTION SCREENS," SID International Symposium Digest of Technical Papers, Journal of the SID (Seattle), pp. 29–32, (May 1993).

Wenyon M et al., "LP–I: LATE–NEWS POSTER: WHITE HOLOGRAPHIC REFLECTORS FOR LCDs," SID International Symposium Digest of Technical Papers, Journal of the SID (Santa Ana), pp. 691–694, (May 13, 1997).

Chen A G et al., "HOLOGRAPHIC REFLECTIVE LIQUID–CRYSTAL DISPLAY" Journal of the Society for Information Display, Journal of the SID (San Jose), vol. 3 (No. 4), pp. 159–163, (Dec. 1, 1995).

Hiyama I et al., "P–45: HIGH–PERFORMANCE REFLECTIVE STN–LCD WITH A BLAZED REFLECTOR," SID International Symposiom Digest of Technical Papers, Journal of the SID (Santa Ana), pp. 655–658, (May 13, 1997).

Mizuno Toru, "Patent Abstracts of Japan," SCREEN, European Patent Office, JPO&Japio, Pub. No. JP 02282784 A, Applicant: Nippondenso Co Ltd., Abstract (Nov. 20, 1990).

* cited by examiner

PASSIVE MATRIX LIQUID CRYSTAL DISPLAY

BACKGROUND OF THE INVENTION

1. Field of the Invention

The present invention relates generally to visual displays, and more particularly to liquid crystal displays with increased contrast and gain between the energized liquid crystals and the background by directing more light incident on the display toward the viewer in a specific and controllable manner.

2. Description of the Related Art

Passive liquid crystal display viewing screens are utilized in hundreds of applications for displaying data to one or more viewers. Such displays are commonly found on wrist watches, clocks, gas pump displays, modern telephones, automobile clocks and instrument clusters, and other applications. These displays typically include a generally light colored background which is visible behind the liquid phase of a liquid crystal composition. When the liquid crystal is energized to display a particular set of information, the liquid crystal turns much darker and creates a contrast between the background and the displayed information. However, under some lighting conditions the contrast is difficult or nearly impossible to see when the conditions minimize the contrast because of reflection on the top layer of the display, low light conditions, high ambient light or other such reasons such as a limited view area.

U.S. Pat. No. 5,534,386 issued to Peterson et al. and entitled "Homogenizer Formed Using Coherent Light and A Holographic Diffuser" discloses a homogenizer in a sheet and a method of making the homogenizer. The homogenizer includes a micro-sculpted surface structure replicated in the sheet which homogenizes the light, and controls the direction and shape of its distribution. This patent discloses that the homogenizer may be used in a transmissive application as well as a reflective application. In the transmissive application the homogenizer is placed between a light source and a viewing area whereby the light passing through the homogenizer improves the quality of light according to the micro-sculpted surface structure. In the reflective application, the homogenizer includes a reflective layer deposited on the same surface as the micro-sculpted surface structures and wherein the reflective layer conforms to the surface structure. Light is then projected onto the homogenizer and reflected by a reflective surface of the homogenizer reflective layer. The reflective surface faces outward in such a construction.

One problem with this construction is that the flow characteristics of the reflective material deposited on these microstructures results in a loss of definition of the structures. For example, a 5° light shaping diffusing surface (i.e., one that produces a cone of light having an angular distribution of 5°) formed in the homogenizer material results in a 20° effective angle on the outward facing reflective surface after deposition of the reflective layer on the embossable layer. Another problem with such a surface is that the reflective layer is somewhat dark and results in a grainy image having medium to low resolution quality. An additional problem with such a surface is that it cannot be cleaned with any frequency because the reflective surface of the layer will be damaged or partially removed when cleaned. Cleaning is not an essential requirement for a liquid crystal display structure incorporating the homogenizer. However, the fact that the surface is too metallic results in excess glare as well as too grainy of an image. A loss of definition of the microstructure is an important problem which will significantly decrease the quality of a liquid crystal display utilizing such a homogenizer.

U.S. Pat. No. 5,609,939 issued to Peterson et al. and assigned to the assignee of the present invention discloses a viewing screen either in a reflective mode or a transmissive mode which utilizes the homogenizer of the '386 patent. The same problems described for the '386 patent are also present in the '939 patent. Related U.S. patents include U.S. Pat. No. 5,631,754 entitled "Holographic High Contrast Viewing Screen Embedded in a Liquid Crystal Display," and U.S. Pat. No. 5,735,988 entitled "Method of Making Liquid Crystal Display." Related U.S. patent applications include Ser. No. 08/782,962 entitled "Apparatus for LCD Backlighting," Ser. No. 08/800,872 entitled "Method of Making Replicas and Compositions for Use Therewith," Ser. No. 09/052,586 entitled "Method of Making Replicas While Preserving Master" and "Method of Making Hard Substrate Diffuser," filed Aug. 24, 1998. These above patents and pending applications are incorporated herein by reference.

SUMMARY OF THE INVENTION

The present invention is directed to a liquid crystal display having improved viewing characteristics as a result of an improved light shaping diffuser or homogenizer construction incorporated into the display. One object of the present invention is to provide a liquid crystal display which is particularly well suited for use in passive light or poor lighting conditions. An additional object of the present invention is to provide a liquid crystal display which produces a background which is essentially of a white appearance or very light appearance. A further object of the present invention is to provide a liquid crystal display incorporating a homogenizer or diffuser producing a projected image having a satisfactory fine grain. An additional object of the present invention is to provide a liquid crystal display which directs a substantial portion of light incident the display toward a predefined viewing area in a particular shape or distribution. A further object of the present invention is to provide a viewing screen of the reflective type which homogenizes light and controls the direction and shape of distribution of light and which can be easily cleaned without damaging the homogenizer microstructure of the viewing screen. Another object of the present invention is to provide a reflective viewing screen wherein the definition or resolution of a light shaping surface microstructures of the viewing screen is maintained after adding a reflective layer. A still further object of the present invention is to provide a reflective viewing screen including a homogenizer that reduces the metalic appearance of the screen.

To accomplish these and other objects of the present invention, a liquid crystal display has a liquid crystal element with a front viewing surface and a rear surface. The liquid crystal display also has a substrate layer with a front side disposed against the rear surface of the liquid crystal element. The substrate layer also has a back side opposite the front side. A light shaping surface microstructure is carried in the front side of the substrate layer wherein the microstructure controls the directionality in which light propagates and scatters the light into a controlled distribution having the desired shape and smooth brightness variation. A reflective layer is deposited on the back side of the substrate layer and is capable of reflecting light back toward the front viewing surface of the liquid crystal element.

The reflective layer can be a metal layer of material vacuum formed or otherwise deposited on the back side of the substrate layer or can be some other layer of material having desirable light reflecting properties. The reflective layer is capable of reflecting light incident on the liquid crystal display thru the liquid crystal element.

In another embodiment, the microstructure is integral in the back side of the substrate layer and the reflected layer deposited over the microstructure.

A reference horizontal plane and a reference vertical plane are defined relative to the front viewing surface extending generally perpendicular relative to the screen. The viewing surface also has a reference normal axis perpendicular to the front viewing surface where the horizontal and vertical planes intersect. These imaginary planes define a field of view which has a viewing width angle measurable along the horizontal plane and a viewing height angle measurable along the vertical plane. Each viewing angle is determined by the shape and size of the micro-sculpted surface structure as well as the type of liquid crystal material utilized in the element.

Both the horizontal viewing angle and the vertical viewing angle have a central axis which is coaxial with the normal axis of the viewing surface thereby making the viewing area symmetrical relative to the viewing surface. In other embodiments, one or both of the horizontal and vertical reference planes may be rotated or offset from a vertical and horizontal reference axis of the viewing surface in order to project light toward a particular desired target wherein the field of view is rotated relative to the reference vertical and horizontal axis of the screen.

The field of view can be defined by both the vertical viewing angle and horizontal viewing angle and has a substantially constant output intensity of light created by the microstructure. This field of view may have a distribution or shape which is generally rectangular, circular, elliptical or such shape as desired for a particular liquid crystal display application.

The liquid crystal display of the invention is particularly well suited for passive or ambient light applications because it directs substantially all of the light photons incident the liquid crystal display to within a particularly defined field of view which can be very accurately controlled. Therefore, the reflective layer substantially increases the brightness of the display and makes it much easier to read information or data on the display.

In another embodiment of the invention, a front projection viewing screen is provided and has a substrate layer with a front viewing surface facing a viewing area and a back side opposite the front viewing surface. A light shaping microsculpted surface structure or microstructure is formed in the front viewing surface of the substrate layer which controls directionality of light propagating from the front viewing surface and scatters the light into a controlled distribution having a smooth brightness variation. A reflective layer is deposited on the back side of the substrate layer and is capable of reflecting light back toward the front viewing surface of the viewing screen.

In another embodiment, the microstructure is formed in the back side of the substrate layer. The reflective layer is deposited on the microstructure on the back side of the substrate layer. The viewing surface in this embodiment is a smooth front side of the layer.

The same characteristics apply for the projection viewing screen except that the liquid crystal display described above is not utilized. Instead, the viewing screen is used as a reflective viewing screen wherein an image is projected onto the screen. By placing the reflective layer on the back side of the substrate layer opposite of the microstructure or on the microstructure on the back side of the substrate layer, the problems with the viewing screen previously invented and patented by the assignee of the present invention are overcome.

In one embodiment, the viewing screen also includes an optional magnetic backing attached to the reflective layer on the back side of the substrate layer. The magnetic backing permits mounting the viewing screen to a metallic surface therefore rendering the viewing screen movable, removable, replaceable and portable as needed.

These and other objects, features and advantages will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention and without departing from the spirit thereof, and the invention includes all such modifications.

BRIEF DESCRIPTIONS OF THE DRAWINGS

A clear conception of the advantages and features of the present invention, and of the construction and operation of the typical mechanisms provided with the present invention, will become more readily apparent by referring to the exemplary and therefore non-limiting embodiments illustrated in the drawings accompanying and forming a part of this specification, and in which.

DETAILED DESCRIPTIONS OF THE PREFERRED EMBODIMENTS

Figure 1:
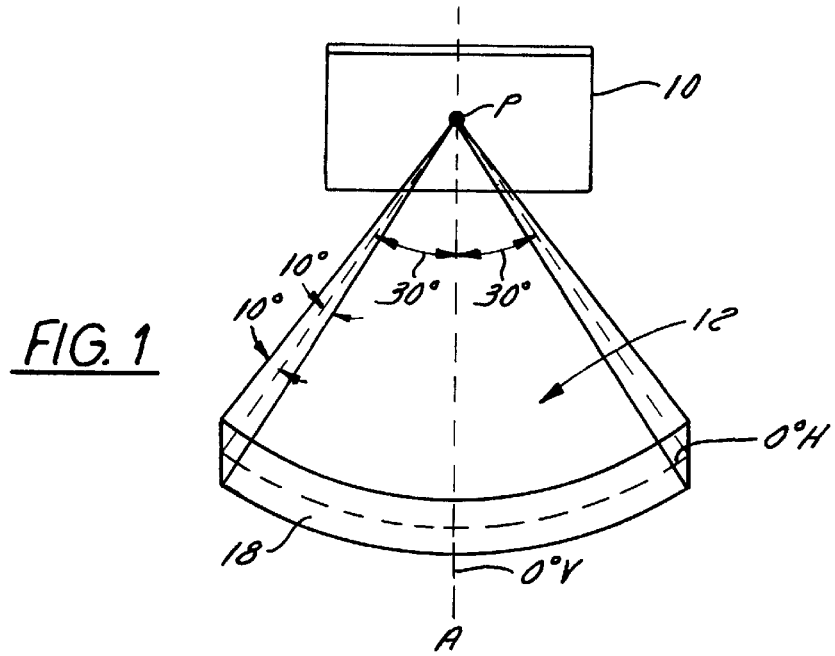
FIG. 1 illustrates a simple schematic view of a predefined viewing area emanating from a front viewing surface of the present invention.

Referring now to the drawings, FIG. 1 illustrates generally a front viewing surface 10 which may be associated with either a liquid crystal display or a front projection viewing screen constructed in accordance with the present invention. The front viewing surface 10 is shown with a viewing area 12 projecting therefrom wherein a viewer located within the viewing area 12 is able to see an image or information presented on the viewing surface 10. A viewer standing outside of the viewing area 12 would not be able to see the image or information on the viewing surface. The projection viewing screen embodiment and the liquid crystal display embodiment of the present invention each are of a reflective mode wherein returned light is reflected from the viewing screen or the liquid crystal display into the viewing area 12. The viewing surface 10 of the present invention may be of any particular size or shape as desired for a particular application and is not intended to limit the scope of the invention in any such manner.

Figure 2:
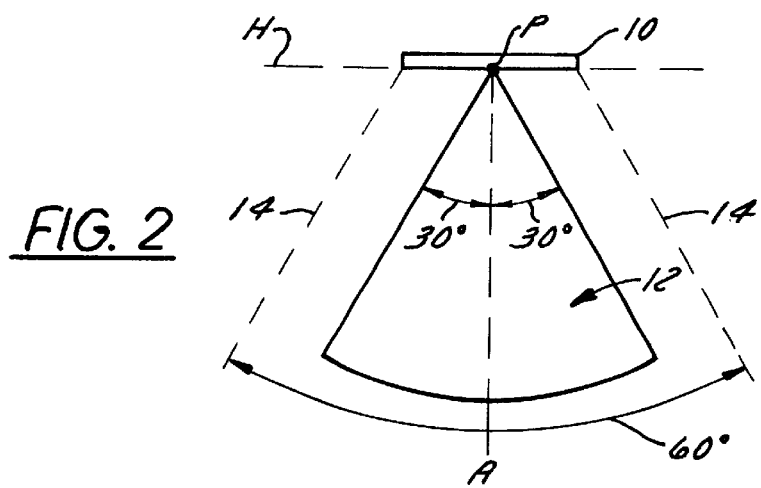
FIG. 2 illustrates a top schematic view of the predefined viewing area and the front viewing surface of FIG. 1.
Figure 3:
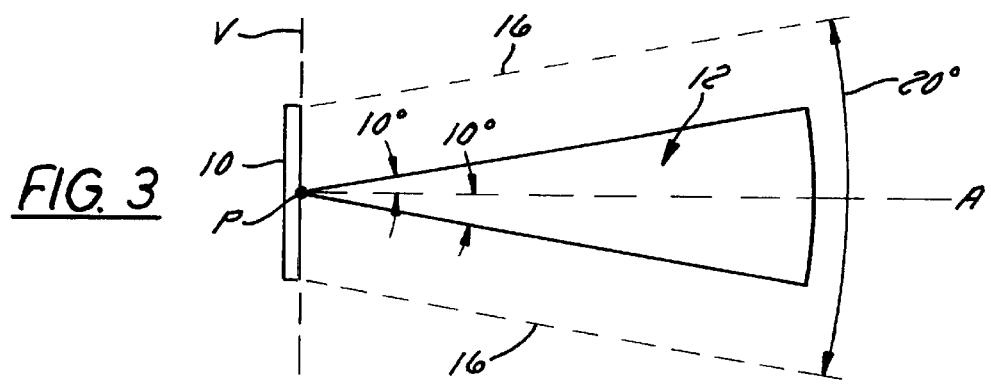
FIG. 3 illustrates a side schematic view of the predefined viewing area and the front viewing surface of FIG. 1.

FIGS. 1–3 illustrate schematically the exemplary predefined viewing area 12 although it is taken from a particular reference point P on the screen. In the present embodiment, the viewing area 12 extends outward from the point P and is projected forward from the viewing surface. A reference normal axis A is shown in FIGS. 1–3 and represents an axis which is substantially perpendicular to the front viewing surface 10 and normal thereto when viewed from the top and the side. A reference horizontal axis H is illustrated in FIG. 2 which is an axis generally parallel to the viewing surface 10 and in a horizontal direction. A reference vertical axis V is illustrated in FIG. 3 and is generally parallel to the viewing surface 10 and extends in a vertical direction.

As illustrated in FIGS. 1–3, light projecting from the point P on the front viewing surface 10 has a vertical component or viewing height angle of, for example, 20° in a vertical plane defined by the normal axis A and the vertical axis V. As viewed in FIG. 3 this viewing height angle of the viewing area is symmetrical about the normal axis A. Depending upon the construction of the present invention, the vertical height component of the viewing area 12 may be offset from the normal axis A wherein all of the viewing area is above or below or at least asymmetrically centered relative to the normal axis A. The measure of the viewing height angle may also be controlled according to the needs of a particular screen application. Using a microstructure as described below, angles of between about 0.2° to about 170° are achievable.

Similarly, as viewed in FIG. 2 the light projecting from the point P in a horizontal plane defined by the horizontal axis H and normal axis A has a horizontal component or viewing angle width of, for example, 60° symmetrically oriented relative to the normal axis A. Again, depending upon the construction of the viewing screen 10 as is described below, the 60° viewing width angle can be varied depending upon the needs of a particular screen application from between about 0.2° to about 170°. Additionally, the horizontal component of the viewing area may be skewed or offset from the normal axis A as well, although it is shown in FIG. 2 as being symmetrical about the normal axis.

Also illustrated in FIGS. 2 and 3 are both the horizontal boundaries 14 and the vertical boundaries 16 for the viewing surface 10. These boundaries originate at the perimeter edges of the viewing screen. Also as illustrated, the boundaries for the exemplary embodiment simply define a viewing area which has, for example, a 60° horizontal spread (viewing width angle) and a 20° vertical spread (viewing height angle).

Additionally, the viewing area 12 is illustrated as being generally rectangular as seen in FIG. 1 when looking at the shape of the light distribution area 18 of the viewing area. Other distributions and configurations can be created or controlled by varying the construction of the viewing screen.

While 60° horizontal angle spread and 20° vertical angle spread are described as an illustration, these angles are only two of many that may be achieved by a light shaping diffuser. In fact, these angles can be as large as 170° or even higher if such a spread for the viewing area vertical and horizontal components is desired. Light shaping diffusers can also produce spread angles as small as 0.2° if such a small spread is desired. For practical applications, however, what is important is brightness enhancement, convenience and cost. The description below details such practical applications with specific innovations.

Figure 4:
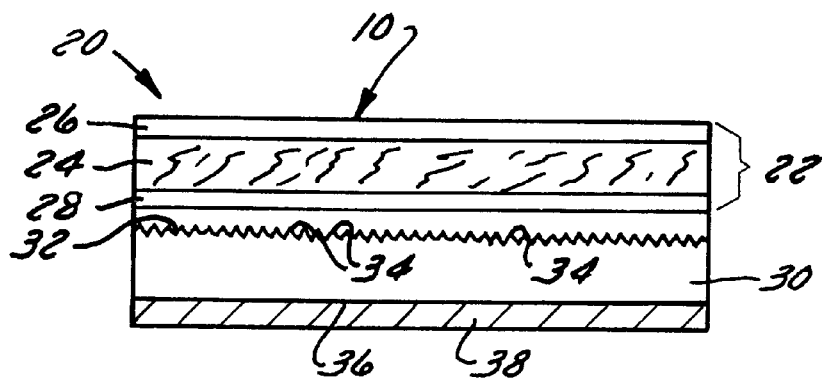
FIG. 4 illustrates an enlarged cross-sectional view of a liquid crystal display constructed in accordance with one embodiment of the present invention.

FIG. 4 illustrates one exemplary embodiment of a portion of a liquid crystal display assembly 20 in cross-section. The liquid crystal display includes a liquid crystal element 22 of a conventional construction. The liquid crystal element typically includes a liquid crystal solution 24 as is known in the art sandwiched between a pair of glass substrate layers 26 and 28. The glass layer 26 of the liquid crystal element 22 on a front side defines the front viewing surface 10 of the display. The liquid crystal element 22 is of a generally conventional construction wherein the liquid crystal solution 24 reacts to application of electrical energy via circuits disposed adjacent to one of the glass substrate layers 26 or 28. The circuits are not shown in order to simplify the description. Wherever energy is applied to the element, the liquid crystal solution 24 reacts so that an image is formed and viewable through the glass substrate 26 from the front side or viewing surface 10.

In the present embodiment of the invention, a substrate 30 is disposed adjacent a back side of the rear glass layer 28 of the liquid crystal element 22. The substrate 30 is transmissive and therefore transmits light therethrough in order to accomplish the desired features of the invention. The material from which the substrate layer 30 is produced can essentially be any translucent material such as plastic, polycarbonate, epoxy, polyester, polyethylene or the like without departing from the spirit and scope of the present invention. The invention is not intended to be limited to any particular material for the substrate layer 30.

The substrate layer 30 has a front side 32 which faces the liquid crystal element 22 and is disposed adjacent the rear glass layer 28. A micro-sculpted surface structure or microstructure 34 is provided on the front side 32 of the substrate and provides light homogenizing, directing, and shaping characteristics of the present invention. The microstructure 34 in the present embodiment is formed integral in the front side of the substrate layer 30 by one of several methods disclosed in the previously incorporated issued patents and patent applications. The particular shape and size of the microstructure typically includes peaks and valleys of a microscopic size. The particular size and shape of these peaks and valleys determines the vertical and horizontal components and the shape distribution of the viewing area 12 described previously.

A back side 36 of the substrate layer 30 faces away from the liquid crystal element 22 and has a reflective layer 38 carried thereon. The reflective layer 38 is in the form of a reflective coating, such as but not limited to a metallic aluminum layer deposited on the surface of the substrate 30 via one of many known means. The reflective layer 38 may be vacuum formed, electro-deposited, or otherwise adhered or placed on the back side 36 of the substrate layer 30.

Utilizing the construction illustrated in FIG. 4, light incident from any angle on the viewing screen surface 10 passes through the liquid crystal element 22, and the substrate layer 30 and is reflected back through the substrate layer and through the liquid crystal element. However, because of the micro-sculpted surface structure 34 on the front side 32 of the substrate layer 30, the light incident on the viewing screen surface 10 regardless of its angle is reflected back into the viewing area 12 within the predefined desired viewing width and height angles. Depending upon the particular construction of the surface structure 34, the viewing area 12 may be very narrow in width or very narrow in height or both depending upon the particular requirements of a given application.

Figure 5:
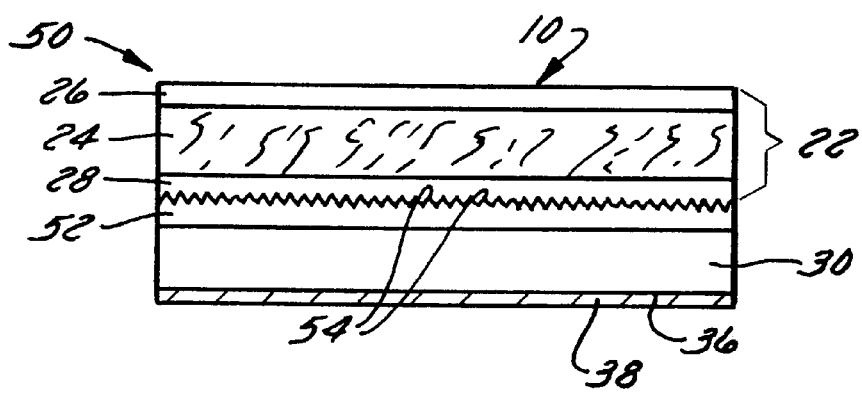
FIG. 5 illustrates a liquid crystal display constructed in accordance with another embodiment of the present invention.

FIG. 5 illustrates another alternative embodiment of a liquid crystal display assembly 50 which includes an identical liquid crystal element 22 including the liquid crystal solution 24 disposed between front and rear glass layers 26 and 28, respectively. In this embodiment, the substrate material layer 30 is again disposed adjacent the rear glass layer 28 of the liquid crystal element 22. However, the front side 32 of the substrate layer is relatively smooth and does not carry thereon an integral micro-sculpted surface structure. A layer of epoxy 52 is disposed over the front surface 32 of the substrate layer 30. The microstructure 54 is formed in the epoxy layer 52 instead of the substrate layer 30. The reflective layer 38 is again disposed or deposited on the back side 36 of the substrate layer 30 in the manner previously described. The epoxy layer 52 is preferably a translucent optical grade epoxy and therefore the liquid crystal display assembly 50 operates substantially the same as the display assembly 20 described previously. However, the mating surfaces between the epoxy layer and the substrate layer may create somewhat of a Fresnel refractive surface slightly reducing the efficiency of the structure.

Figure 6:
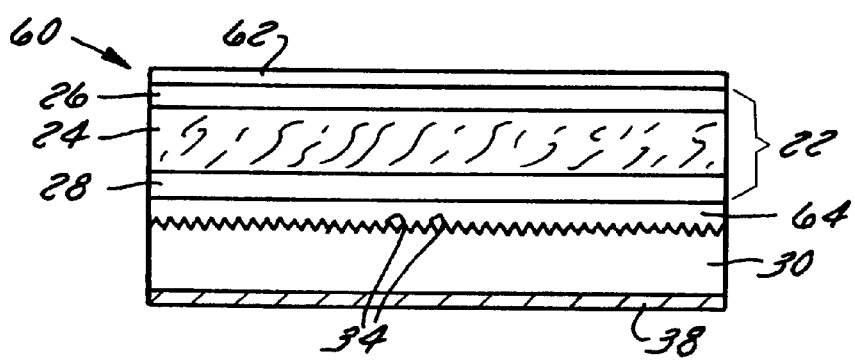
FIG. 6 illustrates another embodiment of a liquid crystal display constructed in accordance with the present invention.

FIG. 6 illustrates another alternative embodiment of a liquid crystal display assembly 60 which again includes essentially an identical liquid crystal display element 22 having the liquid crystal solution 24 sandwiched between a front and rear glass layer 26 and 28, respectively. In this embodiment, the substrate layer 30 is essentially identical to that described for the display assembly 20 of FIG. 4 and functions in the same manner. The difference in this particular embodiment of the liquid crystal display assembly 60 is that a light polarizing layer or polarizer 62 is disposed on the front of the viewing screen surface 10 adjacent the front glass layer 26 of the element 22. An additional polarizing layer or polarizer 64 is placed between the microstructure 34 and the rear glass layer 28 of the liquid crystal element 22. In this optional embodiment, the polarizers 62 and 64 are necessary or required when the liquid crystal display element 22 is a color display instead of a monochromatic display. The polarizers are necessary for proper color display on the viewing screen surface 10 according to known processes. The color liquid crystal element 22 in this embodiment would typically be an indium tin oxide or ITO display element which is utilized to produce a color image.

These different embodiments of liquid crystal display assemblies 20, 50 and 60 are illustrated as exemplary constructions which can accommodate a high brightness reflective screen formed by the substrate layer 30, the micro-sculpted surface structure 34 or 54 and the reflective layer 38 in each embodiment. The reflective substrate assembly including these elements significantly enhances the brightness of the display regardless of the type of liquid crystal element which is utilized. This is because of the light directionality control characteristics of the microstructure 34 formed or otherwise adhered to the substrate layer 30 in each embodiment. These constructions are particularly well suited for passive matrix liquid crystal display applications.

Figure 7A:
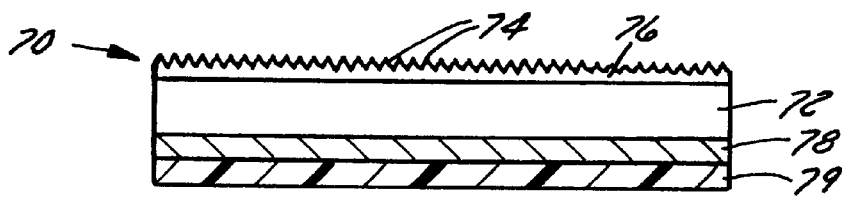
FIGS. 7a and 7b illustrate two different embodiments of a projection viewing screen constructed in accordance with the present invention.
Figure 7B:
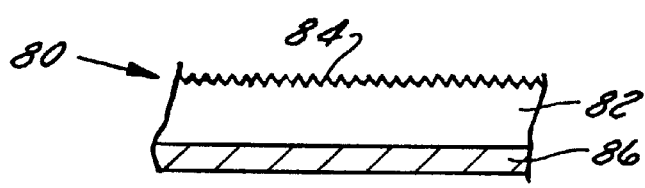

FIGS. 7a and 7b illustrate different alternative embodiments of the invention in the form of a stand alone viewing screen. FIG. 7a illustrates a viewing screen 70 and FIG. 7b illustrates a viewing screen 80 each constructed in accordance with the present invention. The viewing screen 70 includes a substrate material layer 72 essentially identical to the layer 30 described above. A front side of the layer 72 includes an epoxy layer 74 having formed therein a microstructure 76 as described above with regard to the microstructure 34. A reflective layer 78 such as the above-described aluminum layer is deposited on a back side of the substrate layer 72 and again provides the light reflecting characteristics for reflecting incident light back through the substrate layer and the epoxy layer. The viewing screen surface 10 is the microstructure 76 in this viewing screen 70.

Such a viewing screen construction is an improvement over prior viewing screen constructions in that the microstructure 76 is formed in the layer of epoxy which may be repeatedly cleaned when soiled or otherwise is mishandled. The reflective layer 78 is disposed behind the substrate layer 72 and is thus protected from damage. Additionally, such a construction gives a somewhat white appearance and therefore makes for a much improved viewing screen over the previously known screens wherein the reflective layer is deposited over the top of the micro-sculpted surface structure 76. Further, with this construction the reflective layer does not reduce the definition or resolution of the microstructure 76 and therefore does not affect the viewing height and width angles defined by the microstructure 76.

An additional and optional magnetic layer is shown disposed on a back side of the reflective layer 78. This magnetic layer 79 merely assists in mounting the viewing screen 70 to any metallic surface.

FIG. 7b illustrates the viewing screen 80 which is essentially identical to the substrate layer 30 as described above. In this embodiment, the viewing screen 80 includes a substrate layer 82 provided from one of many different translucent materials such as, for example, a polyethylene substrate. A microstructure 84 is formed integral on the substrate layer 82 by one of the methods described in the previously noted issued patents or co-pending patent applications assigned to the assignee of the present invention. A reflective layer 86 is deposited on a back side of the substrate layer 82 and reflects light incident upon the surface containing the microstructure which passes through the substrate layer 82 and is reflected back through the substrate layer by the reflective layer 86.

The viewing screen constructions disclosed in FIGS. 7a and 7b are a significant improvement over prior viewing screen constructions described above which utilize the reflective layer deposited directly onto the micro-sculpted surface structure.

Figure 8:
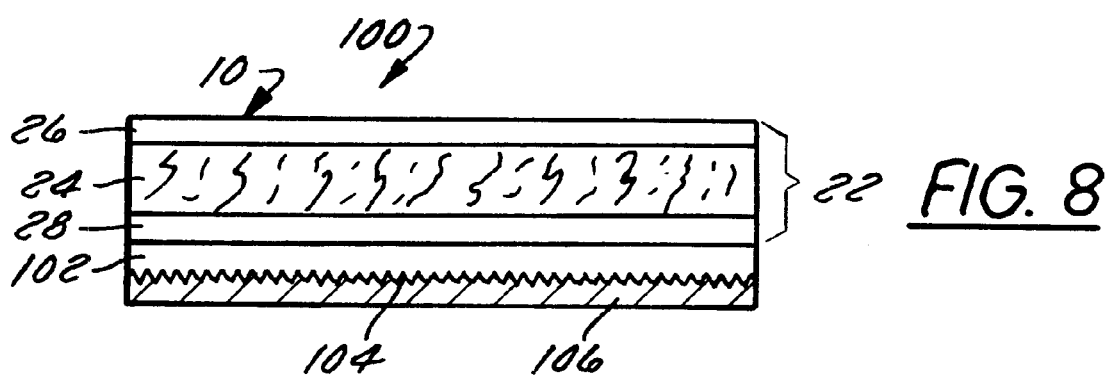
FIG. 8 illustrates a cross-section of a liquid crystal display constructed in accordance with another embodiment of the invention.

FIG. 8 illustrates an alternative embodiment for constructing a liquid crystal display assembly 100. The display assembly 100 includes a liquid crystal element 22 substantially as described above having a liquid crystal solution 24 sandwiched between front and rear glass layers 26 and 28. A substrate layer 102 is disposed adjacent the back glass layer 28 and is of a transmissive type as described above. In this embodiment, the microstructure 104 is integral in the back side surface of the substrate 102. A reflective layer 106 is deposited directly over the microstructure 104 on the back side of the substrate layer 102. Light incident upon the display assembly 100 is transmitted through the liquid crystal element 22, through the substrate layer 102 and then through the microstructure 104 and is reflected back through the assembly by the reflective layer 106.

Figure 9:
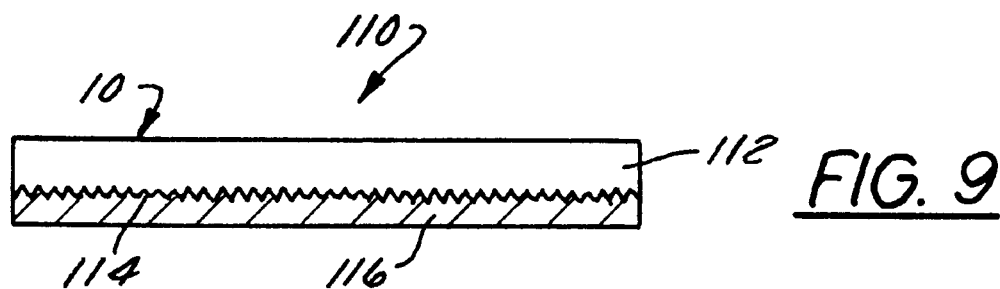
FIG. 9 illustrates a cross-section of a projection viewing screen constructed in accordance with another embodiment of the invention.

FIG. 9 illustrates an alternative embodiment of a front projection viewing screen 110 having a substrate layer 112 which defines on one side the front viewing surface 10. A microstructure 114 is integrally formed on a back side of the substrate 112 and has deposited directly thereon a reflective layer 116. In this embodiment, the exposed front viewing surface 10 receives incident light. The light transmits through the transmissive substrate layer 112 and the microstructure 114 is reflected back through the substrate layer 112 by the reflective layer 116.

Although these two embodiments include the reflective layer deposited directly on the microstructure, the reflective layer is still disposed on a back side of the substrate, layer in each embodiment. Therefore the problems with the previously known embodiment of having the front side be the reflective layer deposited directly over the microstructure are solved.

In each of the above-described embodiments, the liquid crystal displays or the projection viewing screens are described with no reference to applications for use of the subject matter. The liquid crystal display assemblies described above may be utilized in virtually any environment wherein a liquid crystal display is used. However, the liquid crystal display constructions herein are particularly well suited for passive light uses wherein no extrinsic light source is utilized in order to illuminate the display. Only ambient light is utilized in a passive matrix display which typically require a fair amount of light for the display to be visible. The type of construction described above significantly improves the passive liquid crystal display by directing virtually all of the light photons incident the display to within the predefined viewing area 12 and therefore significantly increases the brightness and the usefulness of such displays.

Examples of uses for this type of liquid crystal display are modem telephones, laptop computers, handheld displays for many uses, calculators, video games, radios, stereos, automotive dash panels and instrument clusters, bank machines, watches, and virtually any other type of liquid crystal display. Even modern gas pumps utilize a passive liquid crystal display for providing data to an individual pumping fuel into a vehicle.

In addition, the viewing screen embodiments disclosed in FIGS. 7a, 7b and 9 are also useful in virtually any application where an image is projected onto a reflective screen in order that a person or group of people may view the image if positioned in the viewing area. No light photons are wasted because they are directed into the viewing area only. The viewing screens 70, 80 and 110 are a significant improvement in that even with the lights on in a room, the projected image is clearly visible because virtually all of the light photons hitting the display are directed within the predefined viewing area 12 and therefore increase the brightness of the image.

The particular material utilized for the substrate layers 30, 72, 82, 102 and 112 of the above described embodiments is not intended to limit the scope of the present invention. Additionally, the material utilized for the reflective layers 38, 78 and 86 are also not intended to limit the scope of the present invention.

Though the invention has been described referring to particular embodiments, many other changes and modifications may be made to the invention as described without departing from the spirit and scope thereof. The scope and spirit of these changes will become apparent from the appended claims. The scope of the invention is therefore intended only to be limited by the appended claims.

What is claimed:

1. A passive matrix liquid crystal display comprising:
a liquid crystal element having a front viewing surface and a rear surface, wherein the front viewing surface defines a horizontal plane and a vertical plane, wherein the horizontal and vertical planes define a field of view having a viewing width angle measurable along the horizontal plane and a viewing height angle measurable along the vertical plane;
a substrate layer having a back side and a front side disposed towards and engaging the rear surface of the liquid crystal element, wherein the substrate layer front side is disposed opposite the back side;
a light shaping surface microstructure of preselected shape and size, wherein the microstructure is carried by the substrate layer, wherein the microstructure in combination with the liquid crystal material amount controls the direction in which light propagates from the front viewing surface, scattering the light into a controlled distribution of predetermined shape and smooth brightness variation, wherein the viewing width angle and the viewing height angle are determined by the shape and the size of the light shaping surface microstructure that is selected; and a reflective layer carried by the back side of the substrate layer, wherein the reflective layer is capable of reflecting light back toward the front viewing surface of the liquid crystal element.

2. The display according to claim 1, wherein the reflective layer is a metal layer of material deposited on the back side of the substrate layer.

3. The display according to claim 1, wherein the front viewing surface further defines a normal axis, and wherein the viewing width angle has a horizontal view center axis which is offset from the normal axis of the front viewing surface.

4. The display according to claim 1, wherein the front viewing surface further defines a normal axis, and wherein the viewing height angle has a vertical view center axis which is offset from the normal axis of the front viewing surface.

5. The display according to claim 1, wherein the front viewing surface further defines a normal axis, and wherein the viewing width angle has a horizontal view center axis which is co-axial with the normal axis of the front viewing surface.

6. The display according to claim 1, wherein the front viewing surface defines a normal axis, wherein the viewing height angle has a vertical view center axis which is co-axial with the normal axis of the front viewing surface.

7. The display according to claim 1, wherein the field of view has a substantially constant output intensity.

8. The display according to claim 1, wherein the field of view is substantially rectangular in shape and arcuately disposed.

9. The display according to claim 1, wherein the microstructure is characterized by peaks and valleys provided in the front side of the substrate layer so as to yield reflected light in the field of view in a pattern selected from the group comprising circular, elliptical and rectangular.

10. The display according to claim 1, wherein the microstructure is in the front side of the substrate layer.

11. The display according to claim 1, wherein the microstructure is in the back side of the substrate layer beneath the reflective layer.

12. The display viewing screen according to claim 1, wherein the microstruture includes a plurality of regions characterized by varying refractive indices.

13. The display viewing screen according to claim 12, wherein the change in refractive index between adjacent ones of the regions is non-discontinuous.

14. A viewing screen comprising:
- a substrate layer having a front viewing surface and a back side, wherein the front viewing surface is disposed opposite the back side, wherein the front viewing surface defines a horizontal plane and a vertical plane, and wherein the horizontal plane and the vertical plane together define a field of view having a viewing width angle measurable along the horizontal plane and a viewing height angle measurable along the vertical plane;
- a light shaping microstructure of preselected shape and size, wherein the microstructure is carried by the substrate layer, wherein the microstructure shape and size that is selected controls directionality of light propagating from the front viewing surface, scattering the light into a controlled pattern of predetermined shape and smooth brightness variation, and wherein the viewing width angle and the viewing height angle are both determined by the shape and the size of the light shaping surface microstructure that is selected; and
- a reflective layer deposited on the back side of the substrate layer, wherein the reflective layer is capable of reflecting light back toward the front viewing surface of the viewing screen.

15. The viewing screen according to claim 14, wherein the microstructure is in the front side of the substrate layer.

16. The viewing screen according to claim 14, wherein the microstructure is in the back side of the substrate layer beneath the reflective layer.

17. The viewing screen according to claim 14, wherein the microstructure includes a plurality of regions characterized by varying refractive indices.

18. The viewing screen according to claim 17, wherein the change in refractive index between adjacent ones of the regions is non-discontinuous.

19. A passive matrix liquid crystal display comprising:
- a liquid crystal element having a front viewing surface and a rear surface;
- a substrate layer having a front side disposed against the rear surface of the liquid crystal element and having a back side;
- a light shaping surface microstructure in a side of the substrate layer wherein the microstructure controls the direction in which light propagates independent of the angle at which ambient light impinges the microstructure and which scatters the light into a controlled distribution of smooth brightness variation; and
- a reflective layer deposited on the back side of the substrate layer capable of reflecting ambient light back toward the front viewing surface of the liquid crystal element.

20. A viewing screen comprising:
- a substrate layer having a front viewing surface for facing a viewing area and a back side;
- a light shaping microstructure in a side of the substrate layer wherein the microstructure controls directionality of light propagating from the front viewing surface independent of the angle of which ambient light impinges the microstructure and which scatters the light into a controlled pattern of smooth brightness variation; and
- a reflective layer deposited on the back side of the substrate layer capable of reflecting light back toward the front viewing surface of the viewing screen.

21. A passive matrix liquid crystal display comprising:
- a liquid crystal element having a front viewing surface and a rear surface;
- a substrate layer having a front side disposed against the rear surface of the liquid crystal element and having a back side;
- a light shaping surface microstructure integral with the liquid crystal element and having a plurality of areas, each of the areas being associated with respective particular indices of refraction and wherein the microstructure is recorded so that light traverses adjacent ones of the areas having different indices of refraction with generally no reflection of the light; and
- a reflective layer deposited on the back side of the substrate layer capable of reflecting ambient light back toward the front viewing surface of the liquid crystal element.

* * * * *